US012732398B2

(12) United States Patent
Zu

(10) Patent No.: US 12,732,398 B2
(45) Date of Patent: Sep. 8, 2026

(54) METHOD AND SYSTEM FOR ACQUIRING CHANNEL IMAGES

(71) Applicant: YANGTZE DELTA REGION INSTITUTE(QUZHOU), UNIVERSITY OF ELECTRONIC SCIENCE AND TECHNOLOGY OF CHINA, Quzhou City (CN)

(72) Inventor: Keke Zu, Quzhou City (CN)

( * ) Notice: Subject to any disclaimer, the term of this patent is extended or adjusted under 35 U.S.C. 154(b) by 240 days.

(21) Appl. No.: 18/403,084

(22) Filed: Jan. 3, 2024

(65) Prior Publication Data

US 2024/0235899 A1 Jul. 11, 2024

(30) Foreign Application Priority Data

Jan. 5, 2023 (CN) ......................... 202310023597.0

(51) Int. Cl.
*H04W 4/00* (2018.01)
*H04L 25/02* (2006.01)

(52) U.S. Cl.
CPC ...... *H04L 25/0254* (2013.01); *H04L 25/0256* (2013.01)

(58) Field of Classification Search
CPC ............. H04L 25/0254; H04L 25/0256; H04L 25/025; H04L 25/0242; H04L 25/0224; H04L 25/024; H04L 25/0212; H04B 7/0413; G06N 3/08
USPC .......................................................... 370/328
See application file for complete search history.

(56) References Cited

U.S. PATENT DOCUMENTS

2022/0094462 A1* 3/2022 Ait Aoudia ........... H04L 1/0003
2023/0342590 A1* 10/2023 O'Shea ................ G06N 3/0464
2025/0317938 A1* 10/2025 Haghighat ............ H04L 5/0026

* cited by examiner

*Primary Examiner* — Temica M Beamer
(74) *Attorney, Agent, or Firm* — Howard M. Cohn; Daniel M. Cohn

(57) ABSTRACT

Disclosed herein is a method and a system for acquiring channel images, relating to the field of cross-integration of artificial intelligence neural network and wireless communication system. Based on data-driven artificial intelligence neural network channel estimation, the disclosure obtains a sufficient number of channel images for training the neural network. It overcomes the limitation that the traditional acquisition of channel images dependent on the types of deployed antennas and geometric dimensions, so that the artificial intelligence neural network can be effectively used for channel estimation of wireless communication systems in practice.

10 Claims, 4 Drawing Sheets

METHOD AND SYSTEM FOR ACQUIRING CHANNEL IMAGES

CROSS-REFERENCE TO RELATED APPLICATIONS

This application claims priority under 35 U.S.C. § 119(a) to Chinese Patent Application No. 2023100235970, filed on Jan. 5, 2023, which is hereby incorporated by reference herein in its entirety.

TECHNICAL FIELD

The disclosure belongs to the field of cross-integration of artificial intelligence neural network and wireless communication system, and particularly relates to a method for acquiring channel images.

BACKGROUND

In the field of image processing, image restoration includes image denoising and image reconstruction. In recent years, the image restoration, by image denoising and reconstruction under artificial intelligence neural network technology, have demonstrated excellent performance beyond the traditional technology. In the field of wireless communication, large-scale antenna array technology is widely adopted in various wireless communication systems as it can greatly improve data throughput and spectrum efficiency by equipping more antennas. With more antennas being installed on the base station or terminal, the equivalent wireless channel matrix becomes sparse and the changes between adjacent elements become smaller, which features wireless channels with the characteristics of images. Inspired by this, researchers are committed to applying artificial intelligence to the traditional channel estimation.

According to different training methods of artificial intelligence neural network, channel estimation based on artificial intelligence can be divided into a model-driven type and a data-driven type. The model-driven type assumes that the random wireless channel obeys a certain mathematical distribution. Some researches model the wireless channel as a random distribution obeying sparse Gaussian mixture (GM), and use expectation maximization (EM) to estimate the GM parameters of the wireless channel. In contrast, the data-driven type does not dependent on the prior expert knowledge of which distribution the wireless channel obeys, but uses the collected channel data to train a neural network and obtain a fitting and approximate wireless channel distribution.

In practice, wireless channels vary widely according to different scenes, such as cities, villages, indoor shopping malls, indoor factories, etc., and it is difficult to describe them with a certain mathematical distribution. On the other hand, data-driven channel estimation technology often assumes that a three-dimensional lens antenna array of MXN is equipped at the base station terminal, and further rearranging the channel matrix of MXN to generate a two-dimensional channel image of MNX1. This method for acquiring channel images is dependent on the geometric characteristics of the antenna, including the shape and size, etc., which comes with great limitations. To obtain a 64×64 channel image, it requires 4096 antenna units for a wireless communication system equipped with lens antennas, and 64 antenna units for a linear array antenna on both the base station terminal and the user terminal. This method for acquiring channel images demands expensive hardware resources, high implementation cost, and is constrained by the limited size and power consumption of the device in practice.

For a MIMO (Multiple Input and Multiple Output) wireless communication system equipped with multiple antenna units, assuming that the number of antenna units equipped at the base station terminal is M, the number of antenna units equipped at the user terminal is N, and the number of transmission streams is S (S≤N), an uplink channel matrix can be expressed as $H \in C^{MXS}$, where C represents a complex domain. In a training phase, a pre-designed reference signal $x_t \in C^{SX1}$ is sent by the user terminal at time t, and an observation signal $y_t$ received at the base station terminal is expressed as $$y_t = H_t x_t + n \tag{1}$$

where $n \in C^{MX1}$ represents a noise.

As a mobile communication device at the user terminal is powered by a battery, the power consumption and computing power it can provide are relatively limited. Therefore, in practice, there is usually N=s=1. As the reference signal $x_t$ is known, the least square (LS) channel estimation can be expressed as $$H_{LS} = y_t x_t^{-1} \tag{2}$$

where $H_{LS}$ represents the least square estimation of an initial channel signal $H_t$. The reference signal $x_t$ generally satisfy orthogonality and the $$x_t^{-1}$$

is often replaced with a $$x_t^H.$$

As the least square channel estimation is simple to implement, it has been widely adopted in industry. However, its disadvantages are obvious. Because the noise term is not considered, it significantly amplifies noise when the channel conditions are poor, which will bring about a significant decline in channel estimation performance. Therefore, linear minimum mean square error (LMMSE) channel estimation is often adopted to improve the LS channel estimation, $$H_{LMMSE} = R_{HH}\left(R_{HH} + \frac{\beta}{SNR}\right)H_{LS} \tag{3}$$

where $R_{HH}=E\{HH^H\}$ represents the autocorrelation matrix of the channel signal, β is a constant determined by the constellation points of the transmitted signal (for example, for 16-QAM, β=17/9), and SNR stands for signal-to-noise ratio.

The method based on LMMSE can improve the performance of channel estimation. However, with its high complexity in implementation, especially in acquiring the channel statistical information $R_{HH}$, it is very difficult and inefficient in practical application.

Data-driven artificial intelligence channel estimation features an offline training and an online inference. On the one hand, the complicated and time-consuming aspects are handled during the off-line training. On the other hand, the process of the on-line inference allows for swift responses and does not need prior channel statistical information, which provides a new technical direction for the implementation of channel estimation.

As mentioned above, the model-driven artificial intelligence channel estimation technology suffers from poor generality, and it is difficult to obtain a mathematical distribution for each wireless channel in advance in practical application. Data-driven artificial intelligence channel estimation, on the other hand, exhibits strong generalization capabilities and promising prospects for practical applications. The key to its successful deployment is to obtain a sufficient number of channel images for training.

Through the above analysis, the problems and defects existing in the prior art are as follows.

Traditional LS channel estimation exhibits poor performance. Although LMMSE can greatly improve the performance of channel estimation, but the online operation is complex and costly. The channel estimation assisted by artificial intelligence can achieve high performance and fast online operation simultaneously. However, the acquisition of channel images in the prior art is dependent on the types of deployed antennas and their geometric dimensions, which has some drawbacks, such as substantial consumption of expensive hardware resources, high implementation cost, and which is constrained by the limited size and power requirements of device in practice.

SUMMARY

Aiming at the technical problems exist in the existing method for acquiring channel images, the disclosure provides a novel method for acquiring channel images, so that the data-driven artificial intelligence channel estimation can be effectively deployed to a wireless communication system.

The disclosure is realized as follows:

a method for acquiring channel images, comprising the following steps:

step 1: off-line training; in an off-line training stage, gathering signals at time t (t≥1) to obtain initial channel signals $H=[H_1, H_2, \ldots, H_T]\in C^{MXSXT}$ of a three-dimensional tensor and received signals $H_{LS}=[H_{LS,1}, H_{LS,2}, \ldots, H_{LS,T}]\in C^{MXSXT}$ after passing through channels, wherein the channel signals H and the received signals $H_{LS}$ are used as real signals for a neural network training and input signals to be estimated, respectively, where M represents the number of antennas of a receiving device, S is the number of transmitted data streams, and a time dimension T represents a time observation length (T≥1);

step 2, dimension reconstruction; performing dimension reconstruction on the signals H and $H_{LS}$ of the three-dimensional tensor, fixing the time dimension T, transforming each MXS matrix into a vector of MSX1, and arranging the vector to obtain matrices of a real signal H' and a received signal $$H'_{LS}$$

with a size of MSXT based on the time dimension;

step 3, sliding window selection; employing a sliding window with a size of PXK, with a step size of p, to slide on the time dimensions of the real signal H' and the received signal $$H'_{LS},$$

respectively, anu selecting a channel image with a size of PXK, where P≤MS, K is a time dimension and K≤T;

step 4, real part and imaginary part separation; performing a real part and an imaginary part separation on the selected channel image of PXK to obtain a channel image of PXKX2;

step 5, neural network training; using the obtained channel image of PXKX2 to train a neural network, obtaining a weight coefficient for each layer, and deploying the trained neural network to a device terminal;

step 6, online inference; in an online inference stage, lasting for time K to obtain initial received signals from time 1 to the time K; and step 7: an observation signal at time K+1 consists of observation signals from time 2 to the time K+1, and repeating the above steps at subsequent times:

for the received signal, employing a sliding window with a size of LXQ, with a step size of q, to select a channel image of LXQ;

separating the real part and the imaginary part of the selected channel image of LXQ to obtain a channel image of LXQX2; and inputting the obtained channel image of LXQX2 into the trained neural network model, and obtaining its corresponding real channel estimation value.

In one or more embodiments, the time dimension is used to generate channel tensors and channel images needed by the neural network.

In one or more embodiments, in the off-line training stage, the initial channel signal at time T (T≥1) and the signal after passing through the channel are used as the real signal and the input signal for the neural network training, respectively.

In one or more embodiments, the input signal used for training can be the signal directly received after passing through the channel, or the signal after a preliminary processing, and the preliminary processing method include, but are not limited to, least square (LS) and linear minimum mean square error (LMMSE).

In one or more embodiments, the sliding window in the time dimension acts on the real signal and the input signal respectively to select one or more channel images.

In one or more embodiments, the selected channel images are used to train the neural network and to obtain the weight coefficient for each layer.

In one or more embodiments, in the online inference stage, the system waits for an initial time K (K≥1) to obtain initial received signals from the time 1 to the time K, where the time K may be consistent with or different from the sliding window time dimension K used in the previous offline training stage.

In one or more embodiments, the received signal at the time K+1 consists of the received signals from the time 2 to the time K+1, and so forth.

In one or more embodiments, the sliding window also acts on the received signals on the time dimension to select one or more channel images in the online inference stage.

In one or more embodiments, the size and step size of the sliding window in the online inference stage can be the same or different as those in the offline training stage.

In one or more embodiments, the initial received signals or channel images from the time 1 to the time K+1 can be input into a trained neural network to obtain an estimated value. And inputting the received signals or channel images at the time K+1 into a trained neural network to obtain the channel estimate at the time K+1, and so forth.

Another object of the present disclosure is to provide a system for acquiring channel images, comprising:

- an off-line training module, which is used for collecting signals at time t (t≥1) in an off-line training stage to obtain initial channel signals $H=[H_1, H_2, \ldots, H_T] \in C^{MXSXT}$ of a three-dimensional tensor and received signals $H_{LS}=[H_{LS,1}, H_{LS,2}, \ldots, H_{LS,T}] \in C^{MXSXT}$ after passing through channels, wherein the channel signals H and the received signals $H_{LS}$ are used as real signals for a neural network training and input signals to be estimated, respectively, where M represents the number of antennas of a receiving device, S is the number of transmitted data streams, and a time dimension T represents a time observation length (T≥1);
- a dimension reconstruction module, which is used for performing dimension reconstruction on the signals H and $H_{LS}$ of the three-dimensional tensor, fixing the time dimension T, transforming each MXS matrix into a vector of MSX1, and arranging the vector to obtain matrices of real signals H' and received signals $$H'_{LS}$$

with a size of MSXT based on the time dimension;
- a sliding window selection module, which is used for employing a sliding window with a size of PXK, with a step size of p, to slide on the time dimension of the real signals H' and the received signals $$H'_{LS},$$

respectively, and selecting a channel image with the size of PXK, where P≤MS, K is a time dimension and K≤T;
- a real part and imaginary part separation module, which is used for performing a real part and an imaginary part separation on the selected channel image of PXK to obtain a channel image of PXKX2;
- a neural network training module, which is used for training a neural network by using the obtained channel image of PXKX2 to obtain a weight coefficient for each layer, and deploying the trained neural network to a device terminal; and
- an online inference module, which is used in an online inference stage for the system lasting for time K to obtain initial received signals from time 1 to the time K.

Another object of the present disclosure is to provide a compute device, which comprises a memory and a processor, wherein the memory stores a computer program, and when the computer program is executed by the processor, the compute program causes the processor to perform any one of the above steps of the method for acquiring channel images.

Another object of the present disclosure is to provide a computer-readable storage medium, in which a computer program is stored, and when the compute program is executed by a processor, the processor is caused to perform any one of the above steps of the method for acquiring channel images.

Another object of the present disclosure is to provide an information data processing terminal, which is used to implement the system for acquiring channel images of urban scene remote sensing map based on a Swin-Unet model.

Combining the above technical scheme and the technical problems solved, the technical scheme to be protected by the disclosure provides the following advantages and positive effects.

Firstly, aiming at the technical problems existing in the prior art and the difficulty of solving the problems, closely combining with the technical scheme to be protected, along with the results and data obtained in the research and development process, this paper analyzes in detail and deeply how the technical scheme of the present disclosure solves the technical problems, and brings some creative technical effects after solving the problems. The specific description is as follows.

The newly proposed method for acquiring channel images, based on data-driven artificial intelligence neural network channel estimation, is primarily focused on obtaining a sufficient number of channel images for training a neural network. It solves the limitation that the traditional method for acquiring channel images dependent on the types of deployed antennas and their geometric dimensions, and proposes a novel and effective method for acquiring channel images, so that the artificial intelligence neural network can be effectively used for channel estimation of wireless communication systems in practice.

Secondly, regarding the technical scheme as a whole or from the point of view of products, the technical effects and advantages of the technical scheme to be protected by the present disclosure are specifically described as follows.

From the product point of view, the novel method for acquiring channel images proposed by the disclosure demonstrates greater universality, which enable the channel estimation assisted by artificial intelligence more widely adopted in wireless communication systems. In fact, not all wireless communication systems are equipped with large-scale antenna units at both transmitting and receiving terminals. Taking Wi-Fi as an example, as of the latest standards, it only supports a maximum of 8 antennas at the base station terminal and 4 antennas at the user terminal. More commonly, configurations include 2 or 4 antennas at the base station terminal and 1 antenna at the user terminal. According to the existing method for acquiring channel images, the obtained dimensions of the channel images are 2×1 or 4×1, and after dimensional reconstruction, the maximum achievable dimensions of the channel images is 2×2, which may not provide sufficient information for effective training and inference using artificial intelligence neural networks. By introducing the time dimension and sliding window selection, the method proposed by the disclosure can easily obtain enough effective channel images for neural network training, and the online inference stage can also be better implemented.

Thirdly, as a creative and supporting evidence for the claims of the present disclosure, it is further demonstrated in the following important aspects.

By introducing the idea of time dimension and sliding window selection, the novel method for acquiring channel images provided by the disclosure fills the technical gaps in the industry both domestically in China and internationally outside China.

In the field of wireless communication, there is a general technical prejudice against the application of artificial intelligence in channel estimation and other physical layer algorithms, which many people believe is not feasible. There are two fundamental reasons, one is the high complexity and high cost brought by artificial intelligence assistance, and the other is the universality of artificial intelligence.

The first reason is that people terminal to think in a traditional manner, assuming that effective implementation of AI-assisted channel estimation requires large-scale antennas at both the transmitter and receiver terminals, making it highly expensive. The second reason is that the model-driven artificial intelligence aided channel estimation often assumes that the channel obeys a certain mathematical distribution, resulting in weak generalization capabilities in practical applications.

The disclosure is based on data-driven artificial intelligence to assist channel estimation, possessing strong generalization capabilities. Moreover, as previously analyzed, the disclosure overcomes the limitations of traditional method for acquiring channel images that were dependent on the types and geometric dimensions of deployed antennas by proposing a novel and effective method for acquiring channel images, so that the artificial intelligence neural network can be effectively used for channel estimation of wireless communication systems in practice, and the technical prejudice in the field is well overcome.

DETAILED DESCRIPTION

In order to clarify the purpose, technical scheme and advantages of the present disclosure, the present disclosure will be further described in detail with embodiments. It should be understood that the specific embodiments described here are only used to explain the disclosure, and are not used to limit the disclosure.

In order to make people in the field fully understand the disclosure, this part is an explanatory example to explain the technical scheme of the claim.

Figure 1:
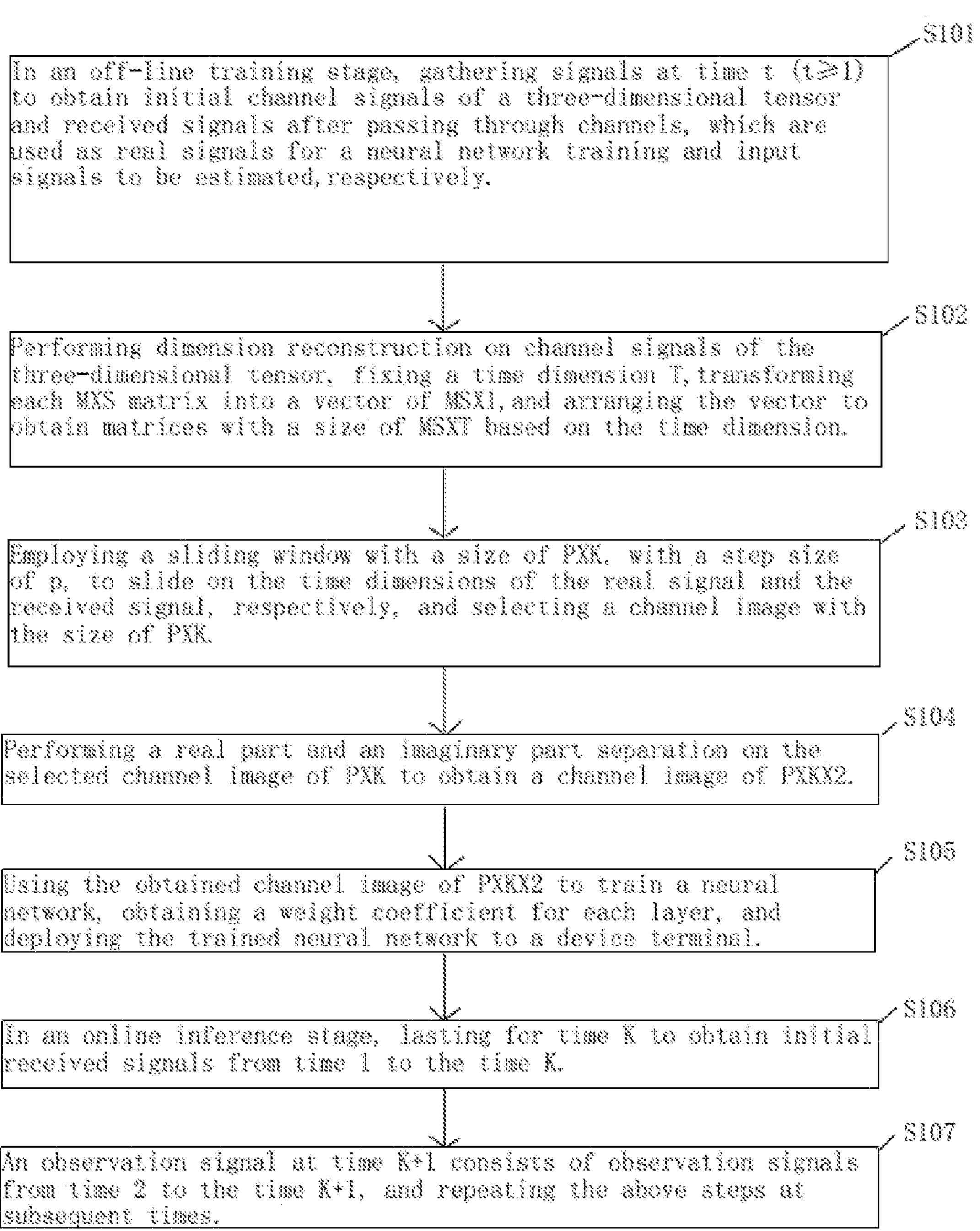
FIG. 1 is a flowchart of a novel method for acquiring channel images according to an embodiment of the present disclosure.
Figure 2:
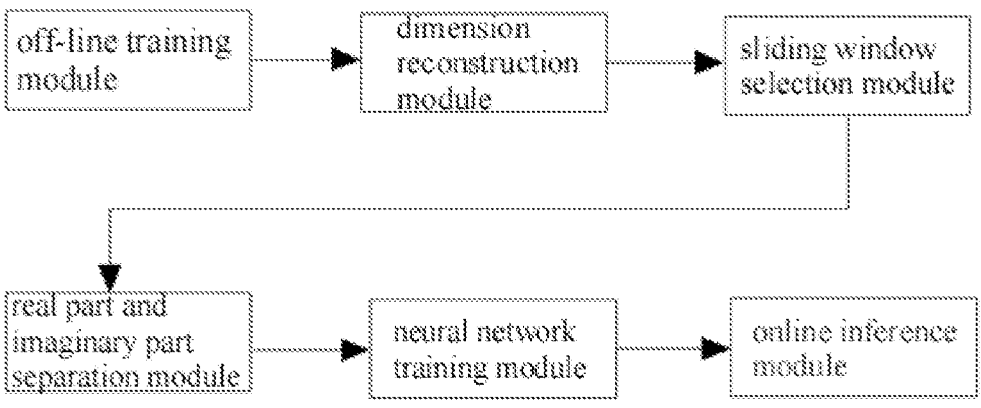
FIG. 2 is a block diagram of a novel system for acquiring channel images according to an embodiment of the present disclosure.

As mentioned above, model-driven artificial intelligence channel estimation techniques suffer from poor generality, making it difficult to obtain the mathematical distribution of each wireless channel in advance in practical application. Data-driven artificial intelligence channel estimation exhibits strong generalization capabilities and holds promising prospects for practical applications. The key to its successful deployment is to obtain a sufficient number of channel images for training. As shown in FIG. 1 and FIG. 2, embodiments according to the present disclosure propose a novel method for acquiring channel images, which enables the data-driven artificial intelligence channel estimation to be effectively deployed to wireless communication systems, and the specific implementation method is as follows.

In step S101; in an off-line training stage, gathering observation signals at time t, and corresponding initial channel signals are $H_1, H_2, \ldots, H_T$ in turn. These initial channels are used for the off-line training, and the acquisition method of the initial channel signals can be obtained by modeling the wireless channels according to the parameters of various types of wireless communication environments. Accordingly, the channel after the least square estimation is $H_{LS,1}, H_{LS,2}, \ldots, H_{LS,T}$. Combining these channel matrices at time t, channel signals $H=[H_1, H_2, \ldots, H_T] \in C^{MXSXT}$ and $H_{LS}=[H_{LS,1}, H_{LS,2}, \ldots, H_{LS,T}] \in C^{MXSXT}$ of a three-dimensional tensor are obtained respectively. The obtained channel signals H and $H_{LS}$ of the three-dimensional tensor are used as an initial channel data set and a polluted channel data set respectively for the off-line training of artificial intelligence neural network.

In step S102; performing dimension reconstruction on channel signals H and $H_{LS}$ of the three-dimensional tensor, fixing the time dimension T (T≥1), transforming each MXS matrix into a vector of MSX1, and arranging the vector to obtain matrices H' and $$H'_{LS}$$

with a size of MSXT based on the time dimension.

In step S103; employing a sliding window with a size of PXK, with a step size of p, to slide on the time dimensions of the real signals H' and the received signals $$H'_{LS},$$

respectively, to select a matric element and obtain a channel image of PXK, where P≤MS, and K≤T. In particular, if P=MS, the total number of channel images obtained is $$\mathrm{Floor}\left(\frac{T-K}{p}\right)+1,$$

where the function Floor (x) indicates rounding down the variable x. A channel matrix selected through a sliding window is collectively called a channel image herein.

In step S104; separating a real part and an imaginary part of the obtained channel images of PXK to obtain a three-dimensional channel tensor of PXK2. In step S105; inputting these channel images of PXK or the three-dimensional channel tensor of PXK2 into a neural network for training to obtain the weight coefficient for each layer, and then deploying the trained neural network to the device terminal.

In step S106; in an online inference stage, it is necessary for the system to wait for time K in the initialization stage to obtain an initial noise observation tensor $H_{LS}=[H_{LS,1}, H_{LS,2}, \ldots, H_{LS,K}]$, then obtain the channel images of PXKX2 according to the above steps, and inputting them into the trained neural network to obtain an estimated value of the initial channel through the trained operation of each layer.

In step S107; from the time K+1, the noise observation tensor $H_{LS}$=[$H_{LS,2}$, $H_{LS,3}$, . . . , $H_{LS,K}$+1] is taken as an input tensor, and processing it to obtain the channel images of PXKX2 according to the above steps. The obtained channel images of PXKX2 is input into the trained neural network to estimate a target channel $H_{K+1}$ by the deployed neural network, that is to say, from the time K+1, the system can estimate channels in real time.

For the estimation of the target channel $H_{K+2}$ at the time K+2, taking the noise observation tensor $H_{LS}$=[$H_{LS,3}$, $H_{LS,4}$, . . . , $H_{LS,K}$+2] as an input tensor, and estimate it through the deployed neural network, and so forth.

It is particularly important to point out that the noise observation tensor $H_{LS}$ used for the off-line training and the on-line inference can be directly replaced by the $y_t$ in formula (1) without the least square channel estimation.

In order to prove the creativity and technical value of the technical scheme of the disclosure, this part is an application example of the technical scheme of the claim on specific products or related technologies.

In order to reduce the cost of the user terminal, in the wireless communication system based on 3GPP standard, the user terminal is usually only equipped with a single antenna. If one aims to ensure that the obtained channel image contains sufficient information, the base station needs to be equipped with a large-scale antenna, which brings about an increase in the acquisition cost of the channel image. The novel method for acquiring channel images provided by the disclosure can be applied to the wireless communication system based on 3GPP standard, and breaks the limitation of the traditional technical scheme on the antenna size at both transmitting and receiving terminals.

The wireless communication system based on Wi-Fi standard is mainly designed for indoor coverage. The common configuration involves two or four antennas at the base station and one antenna at the user terminal. According to the existing method for acquiring channel images, the dimension of the obtained channel image is 2×1 or 4×1, and the maximum achievable dimension of channel image is 2×2 after dimension reconstruction, which may not provide sufficient information for effective training and inference using artificial intelligence neural networks, and existing channel estimation algorithm for such configurations often suffer from limited accuracy. By introducing time dimension and sliding window selection, the method provided by the disclosure can easily obtain enough effective channel images for neural network training.

Similarly, the novel method for acquiring channel images proposed by the disclosure can be applied to other wireless communication systems such as industrial Internet standards.

The following contents are described in combination with the data and charts of the test process.

Figure 3:
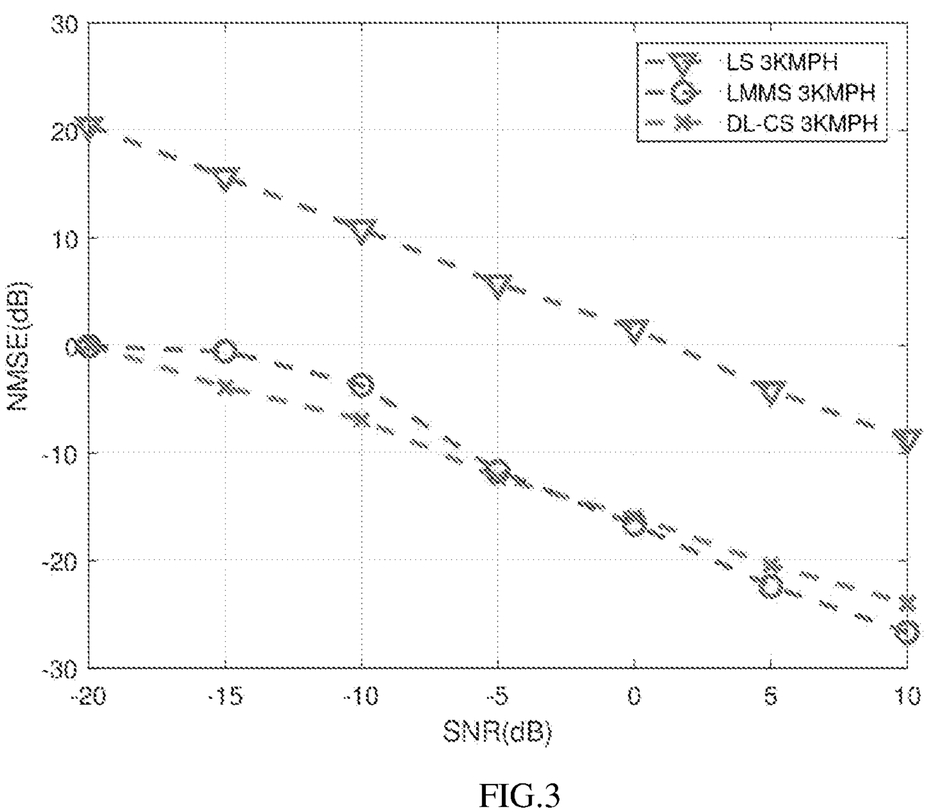
FIG. 3 is a channel estimation graph with a user moving speed of 3 km/h in a 3GPP UMa environment according to an embodiment of the present disclosure.
Figure 4:
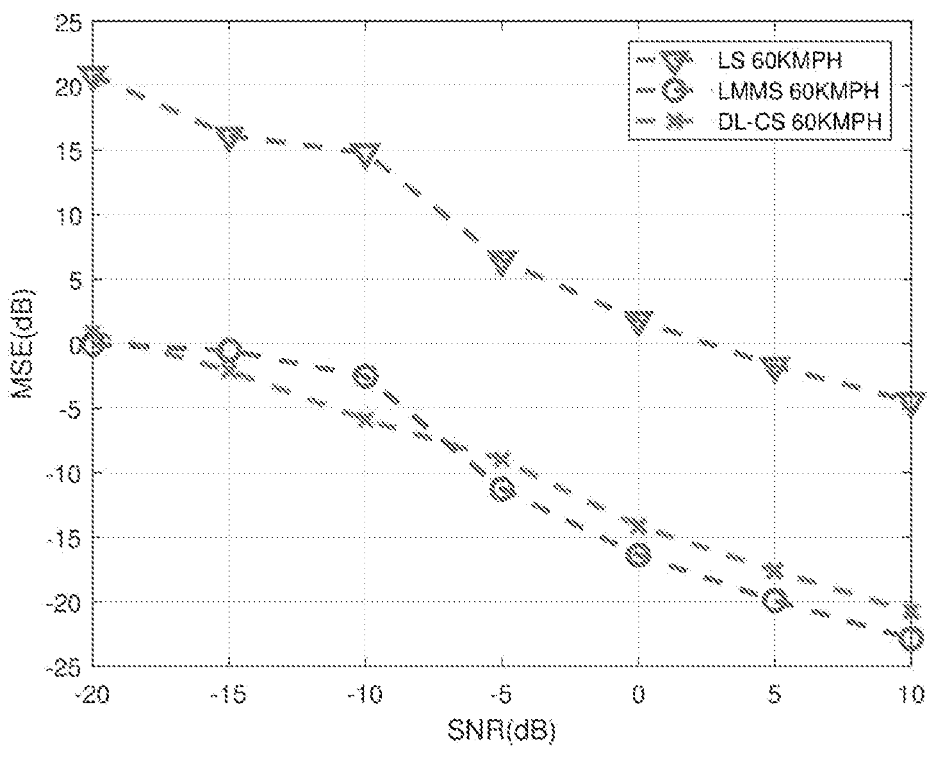
FIG. 4 is a channel estimation graph with a user moving at a speed of 60 kilometers per hour in a 3GPP UMa environment according to an embodiment of the present disclosure.

As shown in FIG. 3 and FIG. 4, a wireless environment has been modeled according to the 3GPP-defined Urban Macro (UMa) scenario. The base station is equipped with 64 antenna units, and the user terminal has 1 antenna unit. When the user's moving speed is 3 km/h and 60 km/h respectively, the deep learning compressed sensing algorithm (DL-CS) based on the method for acquiring channel images of the present disclosure has achieved the optimal performance in low SNR and approximate optimal LMMSE channel estimation performance in high SNR, but with significantly lower implementation complexity than LMMSE.

FIG. 3 shows the channel estimation of a user's moving speed of 3 km/h in a 3GPP UMa environment; and FIG. 4 shows the channel estimation of a user's moving speed of 60 km/h in a 3GPP UMa environment.

It should be noted that embodiments of the present disclosure can be realized by hardware, software, or a combination of software and hardware. The hardware can be implemented using a dedicated logic, while the software can be stored in a memory and executed by a suitable instruction execution system, such as a microprocessor or a specialized designed hardware. Those skilled in the art can understand that the above-mentioned devices and methods can be implemented using computer-executable instructions and/or included in a processor control code, for example, such code is provided on a carrier medium such as a magnetic disk, a CD or DVD-ROM, a programmable memory such as a read-only memory (firmware) or on a data carrier such as an optical or electronic signal carrier. The device and its modules of the present disclosure can be implemented by hardware circuits such as very-large-scale integration circuits or gate arrays, semiconductors such as logic chips and transistors, or programmable hardware devices such as field-programmable gate arrays. Alternatively, they can be implemented by software executed by various types of processors or by a combination of the aforementioned hardware circuits and software, such as firmware.

The above merely describes specific embodiments of the present disclosure, which is not intended to limit the scope of protection of the present disclosure. Any modifications, equivalent variations or substitutions, and improvements made within the spirit and principle of the present disclosure by those skilled in the art according to the disclosed technical scope should be included in the protection scope of the present disclosure.

What is claimed is:

1. A method for acquiring channel images, comprising the following steps:

step 1: off-line training; in an off-line training stage, gathering signals at time t (t≥1) to obtain initial channel signals H=[$H_1$, $H_2$, . . . , $H_T$]∈$C^{MXSXT}$ of a three-dimensional tensor and received signals $H_{LS}$=[$H_{LS,1}$, $H_{LS,2}$, . . . , $H_{LS,T}$]∈$C^{MXSXT}$ after passing through channels, wherein the initial channel signals H and the received signals $H_{LS}$ are used as real signals for a neural network training and input signals to be estimated, respectively, where M represents a number of antennas of a receiving device, S is a number of transmitted data streams, and a time dimension T represents a time observation length (T≥1);

step 2, dimension reconstruction; performing dimension reconstruction on the signals H and $H_{LS}$ of the three-dimensional tensor, fixing the time dimension T, transforming each MXS matrix of the signals H and $H_{LS}$ into a vector of MSX1, and arranging the vector to obtain matrices of real signals H' and received signals $$H'_{LS}$$

with a size of MSXT based on the time dimension;

step 3, sliding window selection; employing a sliding window with a size of PXK, with a step size of p, to slide on the time dimensions of the real signals H' and the received signals $$H'_{LS},$$

respectively, und selecting a channel image with the size of PXK, where P≤MS, K is a time dimension and K≤T;

step 4, real part and imaginary part separation; performing a real part and an imaginary part separation on the selected channel image of PXK to obtain a channel image of PXKX2;

step 5, neural network training; using the obtained channel image of PXKX2 to train a neural network having a plurality of layers, obtaining a weight coefficient for each layer, and deploying the trained neural network to the receiving device;

step 6, online inference; in an online inference stage, lasting for time K to obtain initial received signals from time 1 to the time K; and step 7: the received signal at time K+1 constitutes an observation signal consisting of the received signals from time 2 to the time K+1, and repeating the above steps at subsequent times.

2. The method for acquiring channel images according to claim 1, wherein the time dimension is used for generating a channel tensor and a channel image required by the neural network; and in the off-line training stage, the initial channel signals at time t and the received signals after passing through the channels are used as the real signals and the input signals for the neural network training, respectively.

3. The method for acquiring channel images according to claim 1, wherein the input signals used for training is a signal $y_t$ directly received after passing through the channels or a signal after a preliminary processing, and the preliminary processing method includes least square (LS) and linear minimum mean square error (LMMSE); and the sliding window in the time dimension acts on the real signals and the input signals respectively to select one or more channel images.

4. The method for acquiring channel images according to claim 1, wherein high-quality channel images are selected to train the neural network to obtain the weight coefficient for each layer;

in the online inference stage, lasting for an initial time K (K≥1) to obtain initial received signals from time 1 to the time K, where the time K is or is not consistent with the time dimension K of the sliding window used in the offline training stage; and the received signal at time K+1 consists of the received signals from time 2 to the time K+1.

5. The method for acquiring channel images according to claim 1, wherein in the online inference stage, the sliding window on the time dimension acts on the received signals to select one or more channel images; and the size and step size of the sliding window in the online inference stage is the same as or different from that used in the offline training stage.

6. The method for acquiring channel images according to claim 1, wherein the initial received signals or the channel images from the time 1 to the time K are input into the trained neural network to obtain an estimated value; and inputting the received signal or the channel image at the time K+1 into the trained neural network to obtain the channel estimate at the time K+1.

7. The method for acquiring channel images according to claim 1, wherein in the step 7, the observation signal at the time K+1 consists of the observation signals from the time 2 to the time K+1, and repeating the steps 1 to 7 at subsequent times:

for the received signals, the sliding window with a size of LXQ, with a step size of q, is used to select a channel image of LXQ;

separating a real part and an imaginary part of the selected channel image of LXQ to obtain a channel image of LXQX2; and inputting the obtained channel image of LXQX2 into the trained neural network to obtain its corresponding real channel estimation value.

8. A system for acquiring channel images, comprising:

a memory;

and a processor including a plurality of modules by executing one or more programs stored in the memory, wherein:

an off-line training module, which is used for collecting signals at time t (t≥1) in an off-line training stage to obtain initial channel signals $H=[H_1, H_2, \ldots, H_T] \in C^{MXSXT}$ of a three-dimensional tensor and received signals $H_{LS}=[H_{LS,1}, H_{LS,2}, \ldots, H_{LS,T}] \in C^{MXSXT}$ after passing through channels, wherein the initial channel signals H and the received signals $H_{LS}$ are used as real signals for a neural network training and input signals to be estimated, respectively, where M represents a number of antennas of a receiving device, S is a number of transmitted data streams, and a time dimension T represents a time observation length (T≥1);

a dimension reconstruction module, which is used for performing dimension reconstruction on the signals H and $H_{LS}$ of the three-dimensional tensor, fixing the time dimension T, transforming each MXS matrix of the signals H and $H_{LS}$ into a vector of MSX1, and arranging the vector to obtain matrices of real signals H' and received signals $$H'_{LS}$$

with a size or MSXT based on the time dimension;

a sliding window selection module, which is used for employing a sliding window with a size of PXK, with a step size of p, to slide on the time dimensions of the real signals H' and the received signals $$H'_{LS},$$

respectively, and selecting a channel image with the size of PXK, where P≤MS, K is a time dimension and K≤T;

a real part and imaginary part separation module, which is used for performing real part and imaginary part separation on the selected channel image of PXK to obtain a channel image of PXKX2;

a neural network training module, which is used for training the neural network having a plurality of layers by using the obtained channel image of PXKX2 to obtain a weight coefficient for each layer, and deploying the trained neural network to the receiving device; and an online inference module, which is used in an online inference stage for the system lasting for time K to obtain initial received signals from time 1 to the time K.

9. A computer device, comprising a memory and a processor, wherein the memory stores a computer program, and when the computer program is executed by the processor, the computer program causes the processor to execute the steps of the method for acquiring channel images according to claim 1.

10. A non-transitory computer-readable storage medium storing a computer program which, when executed by a processor, causes the processor to execute steps of the method for acquiring channel images according to claim 1.

* * * * *